United States Patent [19]

Minnick

[11] 4,344,796

[45] Aug. 17, 1982

[54] CEMENTITIOUS COMPOSITIONS AND AGGREGATE DERIVATIVES FROM SAID COMPOSITIONS

[75] Inventor: L. John Minnick, Box 271, Plymouth Meeting, Pa. 19462

[73] Assignee: L. John Minnick, Plymouth Meeting, Pa.

[21] Appl. No.: 207,273

[22] Filed: Nov. 17, 1980

Related U.S. Application Data

[62] Division of Ser. No. 50,206, Jun. 20, 1979, Pat. No. 4,250,134.

[51] Int. Cl.$^3$ .............................................. C04B 19/04
[52] U.S. Cl. ........................................ 106/84; 106/85; 106/97; 106/DIG.1
[58] Field of Search .................... 106/85, 84, 97, 105, 106/106, 109, 118, DIG. 1; 423/244, 555

[56] References Cited

U.S. PATENT DOCUMENTS

| | | | |
|---|---|---|---|
| 3,281,408 | 12/1973 | Lin | 106/109 |
| 3,861,930 | 1/1975 | Lin | 106/118 |
| 4,054,463 | 10/1977 | Lin | 106/97 |

*Primary Examiner*—James Poer
*Attorney, Agent, or Firm*—Austin R. Miller

[57] ABSTRACT

Cementitious compositions and aggregate derivatives of said compositions wherein fluidized bed combustion residue and pozzolanic material, such as pulverized coal combustion system fly ash, are incorporated in a cementitious mix. The mix is cast into desired shape and cured. If desired, the shape may then be crushed so as to result in a fluidized bed combustion residue-fly ash aggregate material or the shape may be used by itself.

15 Claims, No Drawings

CEMENTITIOUS COMPOSITIONS AND AGGREGATE DERIVATIVES FROM SAID COMPOSITIONS

This is a division of application Ser. No. 50,206, filed June 20, 1979, U.S. Pat. No. 4,250,134.

FIELD OF THE INVENTION

The present invention relates to a novel cementitious compositions comprising the spent residue from a fluidized combustion bed of the type wherein lime or limestone particles are suspended in a fluidized medium, and wherein a carbonacoues fuel is ignited proximate said fluidized medium to capture therein substantial amounts of sulfur oxide impurities which are generated upon ignition of the carbonaceous fuel. The invention further relates to aggregate derivatives of said cementitious compositions and to a method for producing both the aggregate and cementitious composition itself. The cementitious compositions produced in accordance with the invention exhibit extremely high compressive strengths so as to allow their use in load bearing applications. The aggregates produced in accordance with the invention not only exhibit high compressive strengths, but are also able to withstand high shear abrasive forces so that the aggregates may successfully be substituted for conventional natural aggregates in most end use applications.

BACKGROUND OF THE INVENTION

The use of coal as a fuel in electric generator plants is well known. In recent times, emphasis upon the burning of coal for this purpose has been increasing due to the dependence of this country on foreign sources of oil, the relative scarcity of oil, and the high price thereof.

As the emphasis has shifted to the use of coal fuel, considerable opposition to its use, especially to the use of "high sulfur" cement fuel has steadily increased. Opponents of the use of coal rely upon the deleterious effects that $SO_x$ emission (resulting from the combustion of coal) into the atmosphere have on the environment.

Generally, two approaches have been used to counter the problem of excess $SO_x$ emissions. The first has been to provide elaborate off-gas scrubbing units in combination with the coal boiler or furnace in coal combustion systems, usually pulverized coal combustion systems. The more generally accepted systems utilize lime or limestone as preferred sorbents. These devices wash the gas and absorb the sulfur oxides, producing a slurry or sludge that contains the sulfur oxide in the form of calcium sulfite and calcium sulfate. Some of the sorbent material that is currently in use contains other ingredients such as dolomitic lime and/or proprietary additives. Generally, the commercial applications are based on the use of either finely ground calcium carbonate (limestone) or a suspension of calcium hydroxide which is produced frm high calcium quick lime.

Another solution to the problem of excess $SO_x$ emission in coal combustion systems has been to provide a fluidized combustion bed of lime or limestone in which the coal is ignited. Preferably, the coal is pulverized and also floats within this fluidized bed during the ignition thereof. The suspended lime or limestone particles thus capture substantial amounts of the oxidized sulfur content of the coal in the form of sulfates and sulfites. After the spent fluidized bed combustion residue has been removed from the coal boiler furnace, problems with respect to the disposal thereof have been presented due to the various governmental regulations pertaining to the protection of the environment, and, also due to the fact that the spent residue has heretofore been thought useful for very few practical applications.

In my paper entitled "Development of Potential Uses for the Residue for Fluidized Bed Combustion Processes", FE 2549-3, I have suggested that the fluidized bed combustion residue be used, inter alia, as a cementitious matrix in the production of road base material, as a sorbent in gas scrubbers, and as a means for stabilizing scrubber sludge when fly ash is added to a combination of the residue sludge.

In my paper entitled "Development of Potential Uses for the Residue from Fluidized Bed Combustion Processes", FE 2549-6, I have suggested, inter alia, that a wet "blunging" pretreatment of the fluidized bed combustion residue is useful as a means of liberating the lime component of the residue (thus providing a relatively inexpensive source of lime) and that the compressive strength of scrubber sludge may be increased by mixing of the residue, sludge, and fly ash in certain proportions.

Accordingly, despite the above noted means by which the spent residue from a fluidized bed combustion system may be utilized, there remains a need for a commercially acceptable disposal method for the spent bed residue.

Despite the above noted disclosure of road base material including said residue, there remains a need for a high strength concrete-like material which incorporates such residue.

Of further importance is the need for a stable aggregate material which can be incorporated into concrete and concrete-like compositions to impart increased strength and dimensional stability thereto.

These and other needs are met by the present invention which is hereinafter described in detail.

DETAILED DESCRIPTION OF THE INVENTION

As used in my invention, the term "fluidized bed combustion residue" (hereinafter FBCR) refers to the spent residue collected from a coal boiler or furnace wherein lime or limestone particles are floated in a fluidized medium proximate to the coal ignition located so as to remove certain $SO_x$ impurities from the ignited coal, which coal is usually in the pulverized state. Fly ash, comprising finely divided siliceous-alumina glass compounds, usually accompanies the off gas through the flue and is removed by means of a bag house or the like.

The composition of the FBCR varies slightly from coal boiler location to coal boiler location. The physical properties of the fluidized bed combustion residue taken from a first boiler plant location are provided in Table 1.

| PHYSICAL PROPERTIES | |
|---|---|
| 1. Gradation (range of all testing to date) - ASTM D 422 - 63 | |
| Sieve Size | % Passing Sieve |
| 1" | 100 |
| #4 | 98.8–100.0 |
| #10 | 82.5–98.8 |
| #40 | 1.4–50.1 |
| #200 | 0.2–4.1 |
| 2. Compaction test - ASTM D 1557 - 70 - Modified Moisture | |

-continued
PHYSICAL PROPERTIES

| Density Relationship | | | |
|---|---|---|---|
| Maximum dry density | 109 pcf | | |
| Optimum moisture content | 15.7–18.9% | | |

3. Dry rodded weight - ASTM C 29 - 77.1 pcf
   Loose unit weight - ASTM C 29 - 72.4 pcf
4. Atterberg limits - ASTM D 423 - 66 and ASTM D 424 - 59
   Plastic limit    No plasticity
   Liquid limit     34%
   Plastic index    Non-plastic
5. California bearing ratio - ASTM D 1883 - 73

| Sample No. | 1 | 2 | 3 |
|---|---|---|---|
| Dry density (before soaking) | 91.6 pcf | 94.0 pcf | 89.3 pcf |
| Moisture content (initial) | 13.4% | 13.3% | 12.9% |
| Moisture content (top 1" after test) | 26.9% | 25.9% | 25.4% |
| Swell | 0.029 | 0.035 | 0.031 |
| Swell | 0.41% | 0.49% | 0.44% |
| Bearing ratio | | | |
| 0.10 inch | 105.0% | 85% | 48.3% |
| 0.20 inch | 106.7% | 90% | 66.7% |

In certain cases, the fluidized bed combustion residue was preconditioned with sufficient water to hydrate the quick lime and release the heat of hydration prior to testing of the residue. The grain size analysis, dry rodded weight and loose weight determinations were performed on dry "as received" residue.

The general soil description of the fluidized bed combustion residue from the first plant location, based on the gradation and plasticity characteristics, is that of a uniformly graded sand. The ASSHTO designation is A-1-b. The Unified Soil Classification System ascribes the letter designation SP for a poorly graded sand. Due to the friable nature of the residue, the classification could shift to SM for a silty sand after compactor forces are applied during placement of the residue in a fill. The loose and dry rodded weight of the residue are somewhat lower in value than natural sand, but the direct shear and permeability data are more typical of a silty sand.

Table II indicates the chemical constituency of fluidized bed combustion residue taken from the first plant location.

TABLE II
RESULTS OF CHEMICAL ANALYSIS OF FBC RESIDUE
(FIRST PLANT LOCATION)

| | As Received FBC Residue (%) | Milled FBC Residue (%) |
|---|---|---|
| Loss on Ignition (LOI) | 9.86 | 6.80 |
| SiO$_2$ | 11.60 | 12.30 |
| CaO | 55.82 | 56.92 |
| Fe$_2$O$_3$ | 4.70 | 3.66 |
| Al$_2$O$_3$ | 1.80 | 3.44 |
| MgO | 1.81 | 0.87 |
| SO$_4$ | 16.69 | 15.92 |

The "as received" residue from the first plant has an effective particle size diameter range of between 0.35–3.60 mm and an average particle size of 1.7 mm. The particle shapes of grains retained on a #30 mesh sieve are flat and angular. These characteristics are more pronounced as the particle size increases up to a #4 mesh material. The larger grains are flatter and subsequently sub-angular to a greater extent. The #8 mesh and larger material is reasonably sound and resistant to mechanical abrasion with finger pressure. Material passing through a #8 mesh sieve is readily friable, producing a light brown powder.

Coloration of the residue from the first plant on the whole is heterogeneous and varies from sample to sample but, in general, the plus #8 mesh material is uniformly reddish brown and similar to a red shell, while the intermediate particle sizes are brighter with a reddish hue speckled with black carbon and white particles. The fines are variable due to the lower percentage of fines available. They range from grey black to grey white in color. The particle size distribution of the "as received" FBCR and the resulting alteration by "milling" (crushed and ground in laboratory jaw crusher and pulverizer) are as shown in Table III.

TABLE III

| Sieve Size | Approximate Percent Retained |
|---|---|
| FBCR "AS RECEIVED" | |
| +4 | 2% |
| +8 | 8% |
| +16 | 52% |
| +30 | 30% |
| +60 | 7% |
| +100 | 2% |
| +200 | 1% |
| −200 | Trace |
| MILLED FBCR | |
| +4 | 0% |
| +8 | 2% |
| +16 | 8% |
| +30 | 18% |
| +60 | 60% |
| +100 | 2% |
| +200 | 0% |
| −200 | 10% |

The net effect in milling the "as received" FBC residue was to fracture the average residue grain into six major parts, with one constituting a fine dust.

The specific gravity of the "as received" FBC residue from the first plant was slightly reduced on milling to possibly increase carbonation and anhydration of the exposed surfaces.

Other residue samples have been taken from the FBC boilers at two other plant locations. Table IV indicates the results of the chemical analysis of these additional two sample residues. Table V indicates the gradation of the two residues. Table VI indicates the results of X-ray diffraction analysis of the two residues.

In regard to the physical and chemical properties of the residue, during the combustion of the pulverized coal within the fluidized medium, the temperature of the fluidized bed causes the limestone particles to liberate carbon dioxide

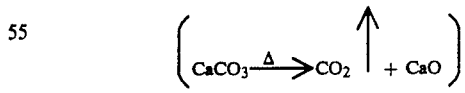

without resulting in substantial diminution of the precursor limestone particle size. When the resulting quicklime component is subjected to the sulfur dioxide emanating from the combusted coal and to the molecular oxygen existing in the combustion air, an anhydrous calcium sulfate reaction product is formed by the following reaction: $2CaO + 2SO_2 + O_2 \rightarrow 2CaSO_4$. The CaSO$_4$ anhydrite is formed about the outer surface of the CaO particles and thus forms a shell which encapsulates the quicklime (CaO). The thickness of this shell is dictated by the length of exposure of the quicklime to the $SO_2$. If the CaO particle in the bed is small, the resulting reaction particle will be comprised of substantially all $CaSO_4$ anhydrite. On the other hand, and as is the case in most instances, the resulting reaction product will comprise spheres of anhydrous $CaSO_4$, with each sphere encapsulating a CaO (quicklime) core component. This factor distinguishes FBCR from other lime reaction products and provides a minor problem in that the $CaSO_4$ shells must be broken before the quicklime component of the residue can be liberated.

TABLE IV

CHEMICAL ANALYSES OF SECOND AND THIRD PLANT LOCATION RESIDUES

|  | Second Plant Location Residue (Samples Received 6/20/78) | | Third Plant Location Residue (Samples Received 6/29/78) | |
| --- | --- | --- | --- | --- |
|  | Drum #1 | Drum #2 | Drum #1 | Drum #2 |
| L.O.I. | 15.54 | 15.54 | 0.94 | 0.66 |
| $SiO_2$ | 6.18 | 5.78 | 1.86 | 2.20 |
| $Al_2O_3$ | 4.13 | 3.96 | 1.22 | 2.04 |
| $Fe_2O_3$ | 8.37 | 7.84 | 4.18 | 3.66 |
| CaO | 47.74 | 51.42 | 63.53 | 59.49 |
| MgO | 7.06 | 7.75 | 2.03 | 3.22 |
| $SO_4$ | 11.94 | 11.96 | 26.73 | 29.04 |

TABLE V

| Sieve Size | Approximate Percent Passing |
| --- | --- |
| FBCR FROM SECOND PLANT LOCATION BOILER | |
| 200 | 78% |
| 100 | 92% |
| 60 | 96% |
| 40 | 98% |
| 20 | 100% |
| FBCR FROM THIRD PLANT LOCATION BOILER | |
| 200 | 0% |
| 100 | 1% |
| 60 | 4% |
| 40 | 10% |
| 20 | 31% |
| 10 | 80% |
| 8 | 86% |
| 4 | 98% |
| ½ | 100% |

TABLE VI

X-RAY DIFFRACTION ANALYSIS OF THE SECOND AND THIRD PLANT LOCATION RESIDUES

|  | Second Plant | Third Plant |
| --- | --- | --- |
| PEAK HEIGHTS (UNITS AT RANGE FACTOR 500) | | |
| $CaSO_4$ | 80 | 136 |
| CaO | 134 | 170 |
| $CaCO_3$ | 30 | — |
| $\alpha SiO_2$ | 34 | — |
| COMPOSITIONAL RANGES | | |
| $CaSO_4$ | Major | Major |
| CaO | Major | Major |
| $CaCO_3$ | Minor | — |
| $\alpha SiO_2$ | Minor | — |

— 1% or less
Trace <5%
Minor 5–25%
Major 25+%

In accordance with the invention, water is added to the FBCR in sufficient quantity to ensure hydration of all of the quicklime particles in the residue to calcium hydroxide. As above noted, the "as received" FBCR contains calcium sulfate anhydrate in the form of spheres which encapsulate the quicklime component, or substantially all of the quicklime component of the FBCR. Accordingly, in order to hydrate the quicklime component, a mixing or mechanical agitation of the residue is necessary. I have found that the addition of from about 20–30 weight % water to the FBCR is sufficient to hydrate substantially all of the quicklime of the residue. As may be seen from the above chemical analyses of the FBCR, the calcium oxide content thereof is usually on the order of about 50%. Of this 50% total approximately one-half is available as free lime. When hydrated, an approximate 16% weight increase in the material occurs due to the chemical combination of water. The addition of 20–30 weight % water to the FBCR provides excess water which may be lost due to evaporation caused by the heat given off during the hydration process.

Mixing of the FBCR and water for about 15 minutes ensures that the water necessary for hydration will come into intimate contact with substantially all of the free or available calcium oxide particles. Cooling of the residue to room temperature after mixing provides for safe handling, and also ensures that the hydration reaction is substantially complete.

Fly ash, or any other pozzolanic material comprised of various silico-alumino and iron compounds usually existing in the form of finely divided spherical glassy particles (as defined in ASTM Standard C-618) is then added to the FBCR water mixture within the range (based upon dry weights) of 10–90% fly ash or equivalent pozzolan to 90–10% of the residue.

Additional water may then be added to the mix to bring the moisture content of the mixture to within the range of about 9–20 weight %.

Cool boiler bottom ash, steel slag, or other natural aggregates may be added to the mixture, if desired.

The mixture is then compacted into the desired shape. In accordance with the invention, masonry blocks, bricks, rip rap, gabions, etc. may be formed from the FBCR-fly ash mixture.

The resulting shapes are then cured. The curing step may be carried out for a period of about 7–28 days or so in a temperature environment around 100 F. As is conventional in the art, steam may also be injected into the curing environment. Longer duration, and lower temperature curing environments may also be successfully utilized in accordance with the invention.

After the shape has been cured, it can be used for the intended application or it can be crushed, using conventional rock or stone handling or crushing equipment to form a desired end use aggregate. The thus formed aggregate may be readily stockpiled for long periods of time without excessive leaching or surface runoff which have normally characterized other stockpiled waste material. The aggregate may then be tested in accordance with the commercially used procedures for characterizing aggregates. As an example, ASTM standard Part 14 may be employed to ensure that the material can meet the requirements for various contemplated end use applications.

EXAMPLE 1

Cylindrical specimens (4" in diameter and 4.5" in height) were molded using mixtures representing 5 different ratios of FBCR and fly ash. The cylinders were compacted in accordance with the procedure specified in ASTM C-593 (three layers, 25 blows per layer, 10 lb. hammer dropped 18"). The resulting cylinders were cured for 7 days at 73° F., and then tested for compressive strength. The compressive strength, molding moisture content, and dry density of each sample are shown herein below in Table VII.

COMPRESSIVE STRENGTH OF MIXTURES OF THIRD PLANT LOCATION FBC RESIDUE AND PULVERIZED COAL FLY ASH

| Composition Third Plant Location | | Moisture Content at Molding (%) | Dry Density (pcf) | Compressive Strength (psi) @ 7 Days @ 73° F. | |
|---|---|---|---|---|---|
| FBC Residue | Fly Ash | | | | |
| 90% | 10% | 15.3 | 95.6 | 147 | |
| | | 22.1 | 98.3 | 274 | 233 Average |
| | | 23.7 | 97.0 | 274 | |
| 80% | 20% | 16.7 | 98.5 | 505 | |
| | | 19.4 | 104.8 | 410 | 408 Average |
| | | 22.9 | 98.7 | 310 | |
| 75% | 25% | 16.6 | 94.9 | 450 | |
| | | 20.2 | 99.1 | 540 | 433 Average |
| | | 24.1 | 93.2 | 310 | |
| 67% | 33% | 14.5 | 96.9 | 520 | |
| | | 18.9 | 102.0 | 760 | 617 Average |
| | | 22.6 | 96.7 | 570 | |
| 50% | 50% | 16.6 | 96.1 | 650 | |
| | | 17.7 | 97.3 | 930 | 807 Average |
| | | 21.8 | 93.9 | 840 | |

EXAMPLE 2

Reef blocks of FBCR and fly ash were molded and cured as indicated in Table VIII hereinbelow. As used herein, the term reef block is a structural unit which is used in the construction of an artificial reef which is adapted to act as a residence for certain organisms which are eaten by marine life. The blocks comprised 80% by weight based upon the dry weight of the mix FBCR and 20 weight % fly ash. The moisture content, dry unit weight and compressive strength of each of the samples is shown in Table VIII.

TABLE VIII

SUMMARY OF REEF BLOCK DATA

| Block No. | Dry Unit Weight* (pcf) | Moisture Content* (%) | Compressive Strength* (psi) 7 Days at 100° F. | Total Weight of Molded Block (lbs.) |
|---|---|---|---|---|
| 1 | 107.1 | 18.8 | 2590 | 104.2 |
| | 114.1 | 15.8 | 2550 | |
| | 116.3 | 13.5 | 2900 | |
| 2 | 113.1 | 14.0 | 1900 | |
| 3 | 113.3 | 14.6 | 2705 | 102.7 |
| | 114.5 | 15.8 | 2270 | |
| | 114.9 | 16.1 | 2310 | |
| 4 | 112.6 | 16.3 | 2470 | 104.0 |
| | 112.0 | 15.2 | 2070 | |
| | 112.1 | 15.2 | 1990 | |
| 5 | 114.4 | 15.8 | 2870 | 110.5 |
| | 114.7 | 16.1 | 2870 | |
| | 113.7 | 15.1 | 2030 | |
| 6 | 117.4 | 14.3 | 2670 | 103.8 |
| | 113.1 | 16.8 | 2820 | |
| | 113.7 | 14.5 | N.T. | |
| 7 | 117.8 | 14.8 | 2190 | 100.2 |
| | 116.3 | 15.3 | 2590 | |
| | 113.4 | 15.4 | N.T. | |
| 8 | 115.8 | 15.8 | 2030 | 102.0 |
| | 114.0 | 14.6 | 2310 | |
| | 115.2 | 16.2 | 1670 | |
| 9 | 106.1 | 19.1 | 1320 | 102.5 |
| | 111.2 | 18.4 | 1340 | |
| | 110.2 | 18.5 | 960 | |
| 10 | N.T. | N.T. | N.T. | 100.0 |
| | 112.9 | 9.0 | 1670 | |
| | 106.9 | 19.6 | 1750 | |
| 11 | N.T. | N.T. | N.T. | 106.0 |
| | 109.4 | 15.7 | N.A. | |

TABLE VIII-continued

SUMMARY OF REEF BLOCK DATA

| Block No. | Dry Unit Weight* (pcf) | Moisture Content* (%) | Compressive Strength* (psi) 7 Days at 100° F. | Total Weight of Molded Block (lbs.) |
|---|---|---|---|---|
| | 106.1 | 16.0 | N.A. | |
| 12 | N.T. | N.T. | N.T. | 107.0 |
| | 111.1 | 15.1 | N.A. | |
| | 109.3 | 15.3 | N.A. | |
| 13 | 117.8 | 14.3 | N.A. | 107.0 |
| | 114.0 | 14.9 | N.A. | |
| | 115.0 | 15.5 | N.A. | |
| Grand Average | 113.0 | 15.6 | 2194 | |

N.A. — Results not yet available
N.T. — Not tested
*Derived from compressive strength test cylinders.

Pellitized aggregate from FBCR-fly ash mixtures can also be made. In this case, pellet formation may be accomplished by means of either a pan or roll pelletizer.

EXAMPLE 3

Pelletized aggregate was made from varying FBCR-bituminous fly ash mixtures and from FBCR-FBC fly ash (top ash or flue ash in a fluidized bed combustion system). The pellets were produced by either roll pellitizing or pan pellitizing with moisture utilized as the binder in the roll pelletizing runs and with a sodium silicate solution being used for the pan pelletizer runs. The FBCR-fly ash proportions, mix additives and my remarks on the produced pellets are listed in Table IX hereinbelow.

TABLE IX

SUMMARY OF PELLETIZING TRIALS

| Mixture Percent by Weight | Pelletizing Technique | Remarks | |
|---|---|---|---|
| | | Mix Additive | Pellets |
| 50% FBC Residue 50% Bituminous Fly Ash | Roll Pan | 22% Moisture 15% Sodium Silicate Solution | Good condition - resisted moderate to strong finger pressure, some surface dusting |
| 80% FBC Residue 20% Bituminous Fly Ash | Roll Pan | 19% Moisture 15% Sodium Silicate Solution | Good condition - resisted moderate to strong finger pressure, more surface dusting than 50-60 pellets |
| 50% FBC Residue | Roll | 8% Moisture | Resisted moderate finger pressure; easily abraded. |
| 50% FBC Fly Ash | Pan | 15% Sodium Silicate Solution | Could not be pelletized. |
| 80% FBC Residue | Roll | 18% Moisture | Could not resist light finger pressure |
| 20% FBC Fly Ash | Pan | Sodium Silicate Solution of Varying Strengths | Could not be pelletized. |

Sintered aggregate pellets comprising FBCR or combinations of FBCR and FBC fly ash can also be made in accordance with the invention.

EXAMPLE 4

Sintered pellets utilizing four size ranges of FBCR were investigated. The size ranges were: As received 100%-10 mesh, 100%-30 mesh, 100%-100 mesh. Small quantities of the pellets were formed by extruding compositions of either 100% FBCR or 80% FBCR blend with 20% FBC fly ash. In all cases, water was used as the binder, with the percentage of moisture addition ranging from 15% up to 40%, depending on the gradation and composition of the pellets.

"Green" pellets representing different size ranges, compositions and moisture content were heated in a muffle furnace manufactured by the Hevi Duty Electric Company, to the following temperatures: 1800° F., 2000° F., 2200° F., 2400° F. As herein used, the term "green" signifies unfired, freshly formed pellets. The pellets were tested for breaking strength while "green" and at the temperatures above noted. The results of this Example appear hereinbelow in Table X.

25-60 weight % aggregate, 5-12 weight % fly ash, 25-60% FBCR, and 3-10 weight % cement.

EXAMPLE 5

Eight trial batches of masonry block, the compositions of which are herein reported in Table XI were prepared and cured in a steam heated tunnel kiln for 24 hours at approximately 130° F. The block specimens were stored on trays which were placed in frames. The frames were placed in the kiln in the order in which the batches were prepared. After the initial kiln cure, the frames were removed from the kiln. Two days after

TABLE X

COMPRESSIVE STRENGTH OF SINTERED AGGREGATE PELLETS MADE FROM FBC RESIDUE

| Pellet Formulation | | | | Pellet Description | | Pellet Breaking Strength (pounds)**** | | | | |
|---|---|---|---|---|---|---|---|---|---|---|
| FBC Residue (%) | Fly Ash (%) | FBCR Gradation | Moisture Content* (%) | Green Consistency | Green Texture | Green | 1800° F. | 2000° F. | 2200° F. | 2400° F. |
| 100 | — | As is | 20 | Good | Very rough | 24 | 24 | 26 | 40 | Melted |
| 100 | — | −10 mesh | 15 | Powdery | Rough | — | — | — | — | — |
| 100 | — | −10 mesh | 20 | Rough | Rough | — | — | — | — | — |
| 100 | — | −10 mesh | 25 | Weak | Rough | 28 | 22 | 24 | 40 | Melted |
| 100 | — | −10 mesh | 30 | Wet mass | Rough | — | — | — | — | — |
| 80 | 20** | −10 mesh | 20 | Powdery | Rough | — | — | — | — | — |
| 80 | 20** | −10 mesh | 25 | Good | Rough | 38 | 21 | 18 | 59 | No Sample |
| 80 | 20** | −10 mesh | 30 | Wet mass | Rough | — | — | — | — | — |
| 80 | 20*** | −10 mesh | 25 | Powdery | Rough | — | — | — | — | — |
| 80 | 20*** | −10 mesh | 30 | Powdery | Rough | — | — | — | — | — |
| 80 | 20*** | −10 mesh | 35 | Plastic | Rough | 52 | 29 | 24 | 43 | 91 |
| 100 | — | −30 mesh | 20 | Too dry | Acceptable | — | — | — | — | — |
| 100 | — | −30 mesh | 25 | Good | Acceptable | 30 | 33 | 30 | 57 | Melted |
| 100 | — | −30 mesh | 30 | Wet mass | Acceptable | — | — | — | — | — |
| 100 | — | −30 mesh | 35 | Far too wet | Acceptable | — | — | — | — | — |
| 80 | 20*** | −30 mesh | 25 | Powdery | Good | — | — | — | — | — |
| 80 | 20*** | −30 mesh | 30 | Powdery | Good | — | — | — | — | — |
| 80 | 20*** | −30 mesh | 35 | Good | Good | 59 | 29 | 39 | 73 | 90 |
| 100 | — | −100 mesh | 30 | Powdery | Very good | — | — | — | — | — |
| 100 | — | −100 mesh | 35 | Good | Very good | 40 | 37 | 40 | 58 | Melted |
| 100 | — | −100 mesh | 40 | Wet mass | Very good | — | — | — | — | — |
| 80 | 20*** | −100 mesh | 30 | Powdery | Best | — | — | — | — | — |
| 80 | 20*** | −100 mesh | 35 | Good | Best | 76 | 60 | 63 | 89 | 104 |
| 80 | 20*** | −100 mesh | 40 | Wet mass | Best | — | — | — | — | — |

*Moisture content determined on a dry weight basis
**Initial sample of FBC fly ash
***Second sample of FBC fly ash
****Average of five 1 square inch specimens In accordance with another aspect of the invention, concrete masonry units may be produced comprising varied proportions of FBCR, aggregate, fly ash, and cement. In this respect, it has been found that the following percentages by weight of the various components (based on the dry mix weight) have been useful:

molding, blocks from each batch were tested in accordance with ASTM C-140, and the testing was repeated at 12 days of age and at 30 days of age. Table X.I also indicates the compressive strength of the various masonry units produced in accordance with this example, as tested by ASTM C-140.

TABLE XI

MIX DESIGN AND TEST RESULTS FOR CONCRETE MASONRY UNITS
COMPOSITION
(Pounds per Cubic Yard)

| Mix Designation | Control | Mix 1 | Mix 2 | Mix 3 | Mix 4 |
|---|---|---|---|---|---|
| Portland Cement - Type 1 | 328 | 349 | 327 | 319 | 118 |
| Limestone Screenings Aggregate (⅜") | 3635 | 2044 | 1918 | 933 | 2247 |
| Fly Ash - National Mineral Corp. | 71 | 215 | 404 | 394 | 237 |
| AFB Residue | 0 | 1077 | 1010 | 1969 | 1185 |
| Water | 246 | 358 | 348 | 364 | 310 |
| Total Weight per Cubic Yard | 4279 | 4043 | 4008 | 3979 | 4097 |
| Compressive Strength @ 30 Days Age | 820psi | 1070psi | 1453psi | 212psi | 278psi |
| Dry Unit Weight @ 30 Days Age | 130.7pcf | 119.5pcf | 131.3pcf | 102.1pcf | 106.8pcf |
| Absorption | 8.1% | 10.8% | 6.9% | 18.0% | 15.8% |
| % Compaction (Based on | | | | | |

TABLE XI-continued
MIX DESIGN AND TEST RESULTS FOR CONCRETE MASONRY UNITS
COMPOSITION
(Pounds per Cubic Yard)

| Mix Designation | Control | Mix 1 | Mix 2 | Mix 3 | Mix 4 |
|---|---|---|---|---|---|
| theoretical dry unit weight) | 87.5% | 87.6% | 96.8% | 76.3% | 76.2% |

NOTE:
The control mix and mix numbers 1 and 2 can be compared directly, but the proportions of fine and coarse fractions in mix numbers 3 and 4 resulted in low densities which, therefore, did not provide a satisfactory product. High initial temperatures of 101° F. and 104° F. after molding may have also been a factor.

It is to be noted that the masonry units, reef blocks, and other articles produced hereby may be used by themselves, or may be crushed into aggregates of various sizes. Due to the surprisingly high compressive strengths of the disclosed mixes, they can be successfully employed in load bearing situations wherein conventional concrete formulations are now used. The aggregates exhibit excellent dimensional stability, high structural strength, low permeability and non-leachability. Due to the low permeability and non-leachability characteristics of the produced aggregates, they may be readily stockpiled without causing environmental concern due to leaching and surface run-off as is the case in the stockpiling of many other industrial waste products. The thus formed aggregates are especially useful for combination in various concrete mixes, mortar mixes, road base material mixes and in landfill mixes. The aggregate may also be used as ballast in varied applications.

The term "limestone" as herein used refers to naturally occurring limestone or dolomite generally consisting of calcium carbonate or a mixture of calcium carbonate and magnesium carbonate. As further used, reference to the "hydration of lime" or to "hydrated lime" refers to calcium hydroxide (hydrated high calcium quicklime) or a mixture of calcium hydroxide and either magnesium oxide (dolomitic monohydrate) or magnesium hydroxide (dolomitic dihydrate).

Those skilled in the art may make certain modifications or substitutions to my invention without departing from the true spirit thereof. The appended claims are intended to cover all substitutions and equivalent modifications.

I claim:

1. Cementitious composition comprising:
   (a) the anhydrous spent residue from a fluidized combustion bed of the type wherein limestone particles are suspended in a dry condition in the presence of a carbonaceous fuel in a fluidized medium and wherein the carbonaceous fuel is ignited within said fluidized medium to capture therein substantial amounts of $SO_x$ which is generated upon ignition of said carbonaceous fuel said residue containing coal ash which is substantially free of finely divided siliceous-alumina glass compounds,
   (b) water, and
   (c) pozzolanic materials.
2. Aggregate composition comprising 10–90% by weight fluidized bed combustion residue as defined in claim 1 and 90–10% by weight pulverized coal combustion system fly ash.
3. Aggregate composition as defined in claim 2 wherein about 10–50% by weight fly ash and about 90–50% by weight fluidized bed combustion residue are provided, the foregoing percentages adding up to 100%.
4. Aggregate composition as recited in claim 2 wherein said aggregate exists as a pellet-like shape.
5. Aggregate composition as defined in claim 4 further comprising a sodium silicate binder.
6. Aggregate composition as defined in claim 4 wherein said aggregate has been sintered.
7. Masonry block comprising 10–90% by weight fluidized bed combustion residue as defined in claim 1 and 90–10% by weight pulverized coal combustion system fly ash.
8. Masonry block as recited in claim 7 wherein about 10–50% by weight fly ash and about 90–50% by weight fluidized bed combustion residue are provided, the foregoing percentages adding up to 100.
9. Reef block comprising 10–90% by weight fluidized bed combustion residue as defined in claim 1 and 10–90% by weight pulverized coal combustion system fly ash.
10. Reef block as defined in claim 2 wherein about 10–50% by weight fly ash and about 90–50% by weight residue are provided, the foregoing percentages adding up to 100.
11. Concrete composition comprising:
    (a) fluidized bed combustion residue as defined herein in claim 1;
    (b) aggregate;
    (c) cement;
    (d) fly ash.
12. Concrete composition as defined in claim 11 wherein about 25–60 weight percent aggregate, about 5–12 weight percent fly ash, about 25–60% fluidized bed combustion residue and about 3–10 weight percent of cement are provided, the foregoing percentages being based upon the dry weight of the concrete composition, and the foregoing percentages equaling 100.
13. Cementitious composition as defined in claim 1 wherein the anhydrous spent fluidized combustion bed residue contains about 7 to about 20% carbonaceous fuel ash.
14. Cementitious composition as defined in claim 1 wherein the anhydrous spent fluidized combustion bed residue has a loss on ignition of about 0.5 to about 15%.
15. Cementitious composition comprising:
    (a) about 10–90% by weight of the anhydrous spent residue from a fluidized combustion bed of the type wherein limestone particles are suspended in a dry condition in the presence of a carbonaceous fuel in a fluidized medium and wherein the carbonaceous fuel is ignited within said fluidized medium to capture therein substantial amounts of $SO_x$ which is generated upon ignition of said carbonaceous fuel, said residue containing coal ash which is substantially free of finely divided siliceous-alumina glass compounds,
    (b) water, and
    (c) about 90–10% by weight fly ash.

* * * * *

UNITED STATES PATENT AND TRADEMARK OFFICE
CERTIFICATE OF CORRECTION

PATENT NO. : 4,344,796
DATED : Aug. 17, 1982
INVENTOR(S) : L. John Minnick

It is certified that error appears in the above—identified patent and that said Letters Patent is hereby corrected as shown below:

Column 3, Table I, line 30, under "Sample No. 3", delete "48.3%" and insert --58.3%--.

Column 6, line 34, delete "Cool" and insert --Coal--.

Column 6, line 42, delete "100 F" and insert --100°F--.

Column 7, Table VIII, Column 2, line 5, delete "113.3" and insert --115.3--.

Column 8, Table IX, Column 4, line 9, delete "50-60" and insert -- 50-50 --.

Signed and Sealed this

Twenty-sixth Day of April 1983

[SEAL]

Attest:

GERALD J. MOSSINGHOFF

Attesting Officer *Commissioner of Patents and Trademarks*